Aug. 1, 1950   B. L. MONTAGUE   2,517,016
PULPWOOD HARVESTER CARRIAGE
Filed April 3, 1947   10 Sheets-Sheet 1

Inventor,
Bert L. Montague,
By Albert E. Dieterich,
Attorney.

Aug. 1, 1950  B. L. MONTAGUE  2,517,016
PULPWOOD HARVESTER CARRIAGE
Filed April 3, 1947  10 Sheets-Sheet 2
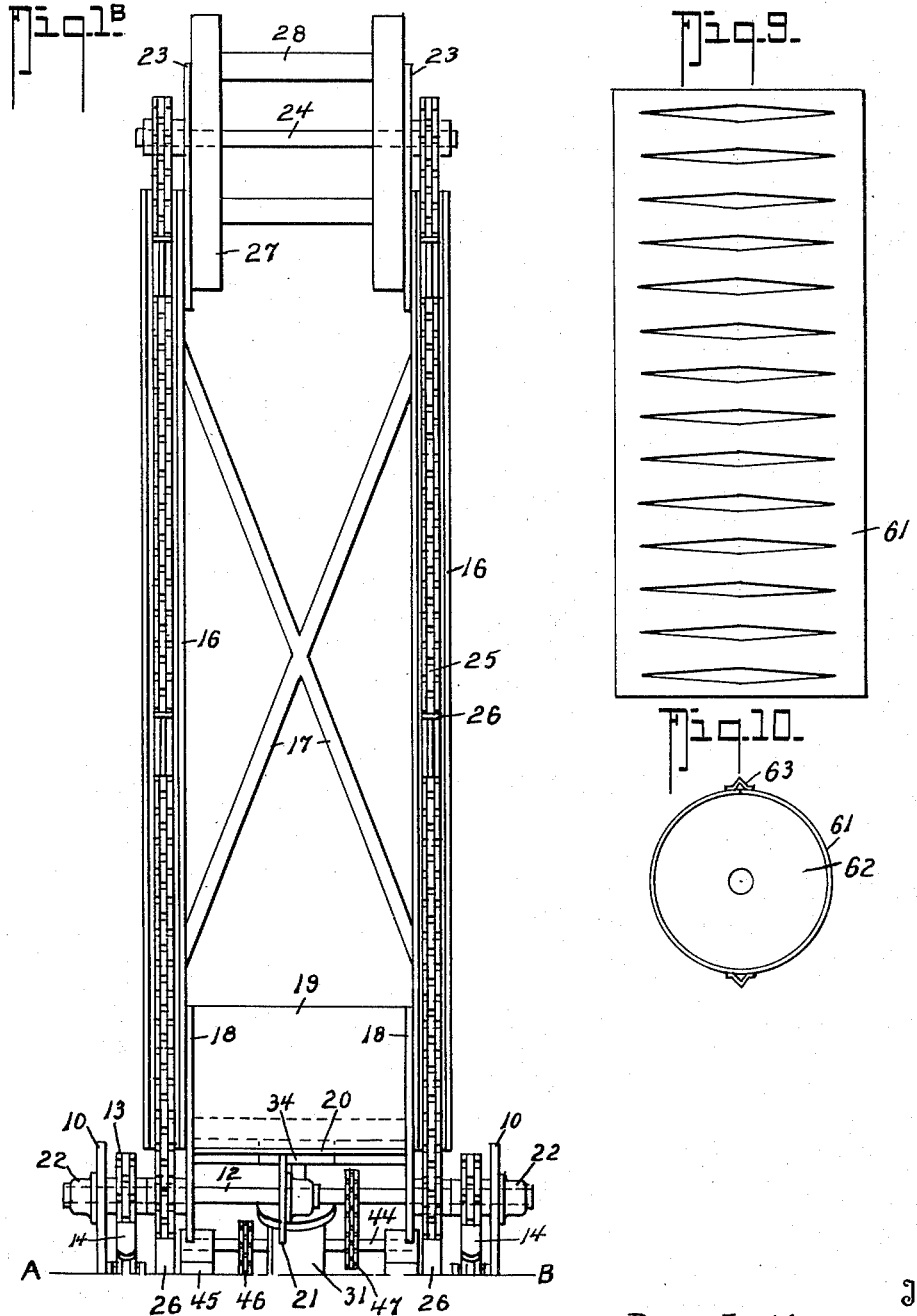
Inventor,
Bert L. Montague,
By Albert E. Dieterich,
Attorney.

Aug. 1, 1950        B. L. MONTAGUE        2,517,016
PULPWOOD HARVESTER CARRIAGE
Filed April 3, 1947        10 Sheets-Sheet 3
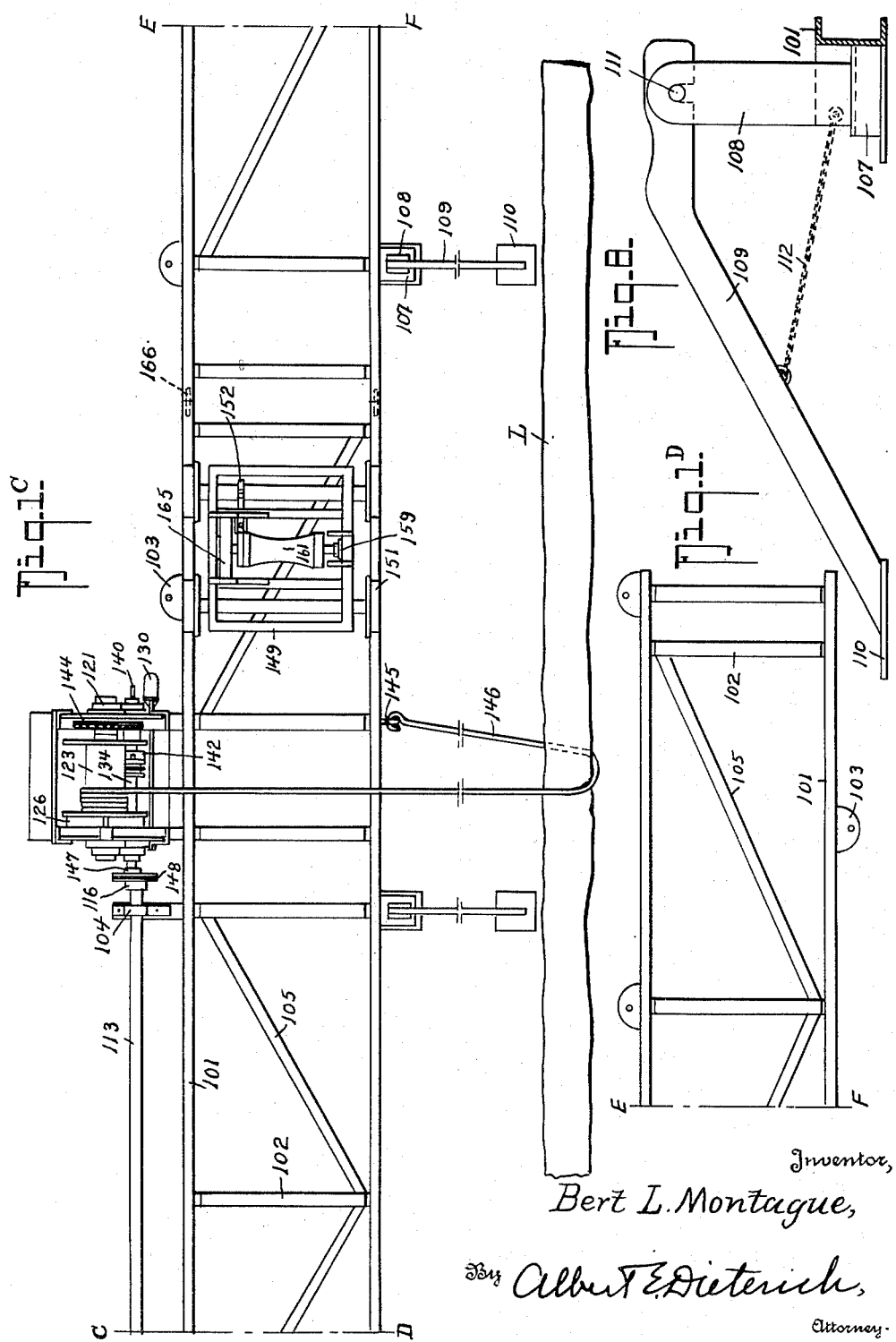
Inventor,
Bert L. Montague,
By Albert E. Dieterich,
Attorney.

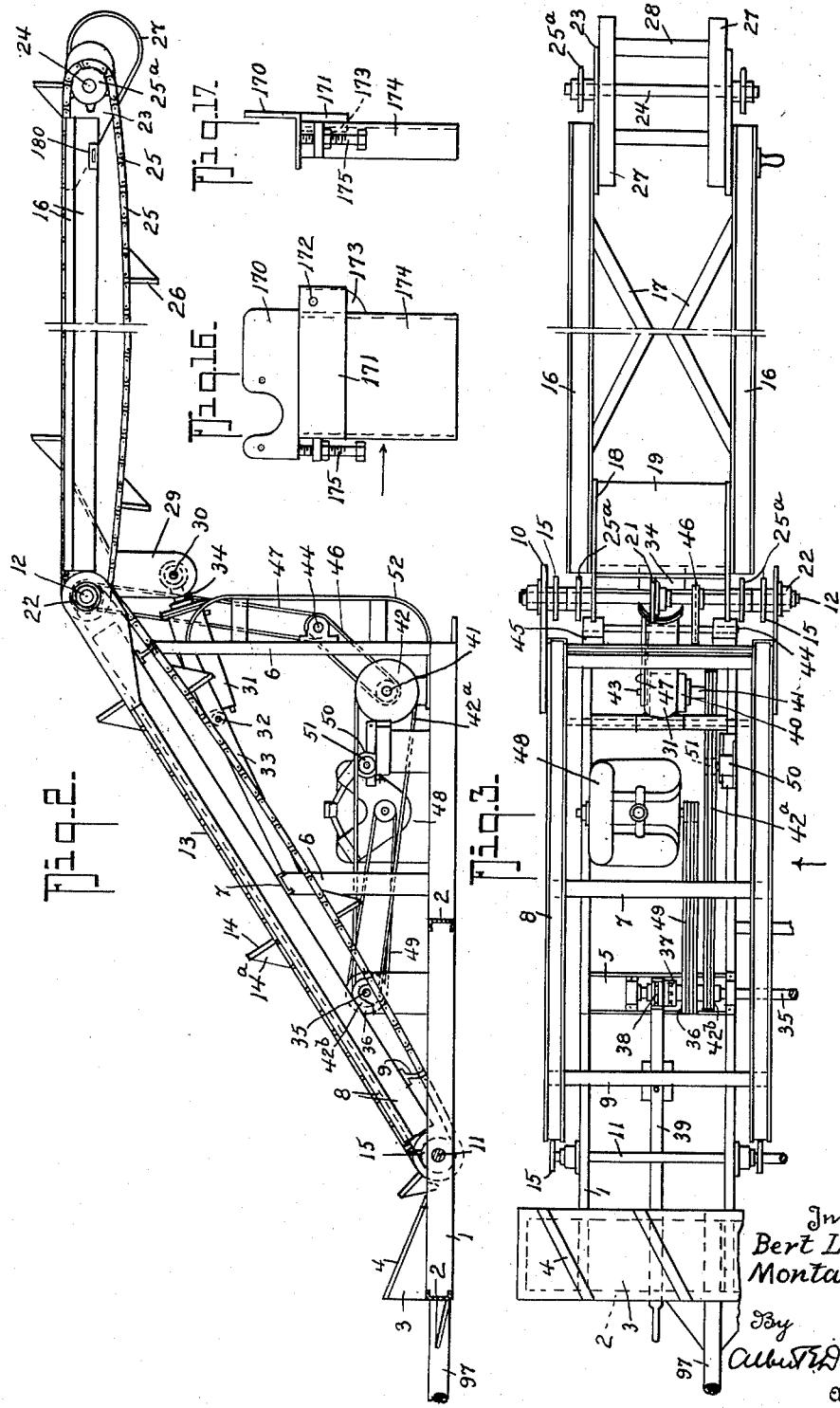

Aug. 1, 1950     B. L. MONTAGUE     2,517,016
PULPWOOD HARVESTER CARRIAGE
Filed April 3, 1947     10 Sheets-Sheet 5
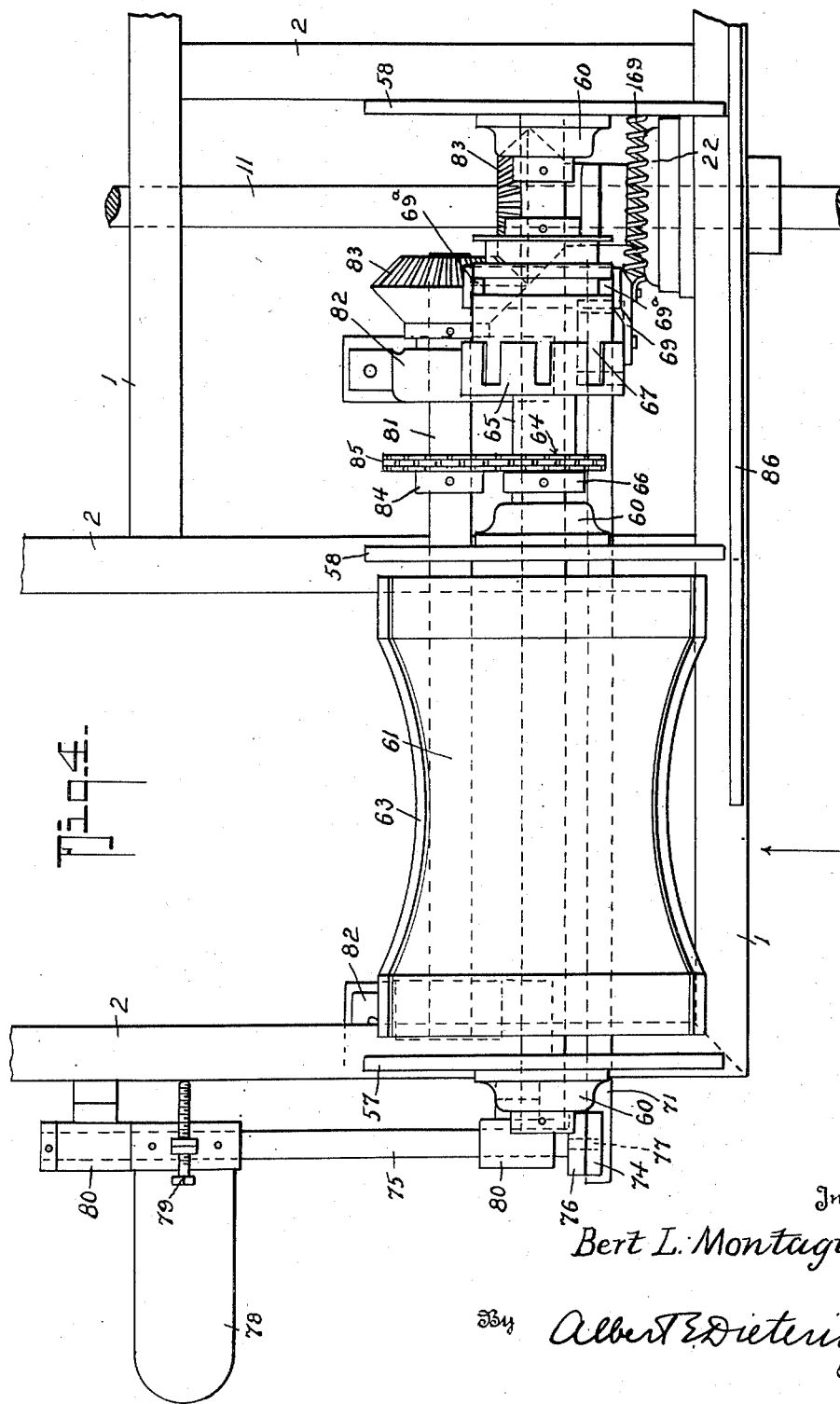
Inventor,
Bert L. Montague,
By Albert E. Dieterich,
Attorney.

Aug. 1, 1950
B. L. MONTAGUE
2,517,016
PULPWOOD HARVESTER CARRIAGE
Filed April 3, 1947
10 Sheets-Sheet 6
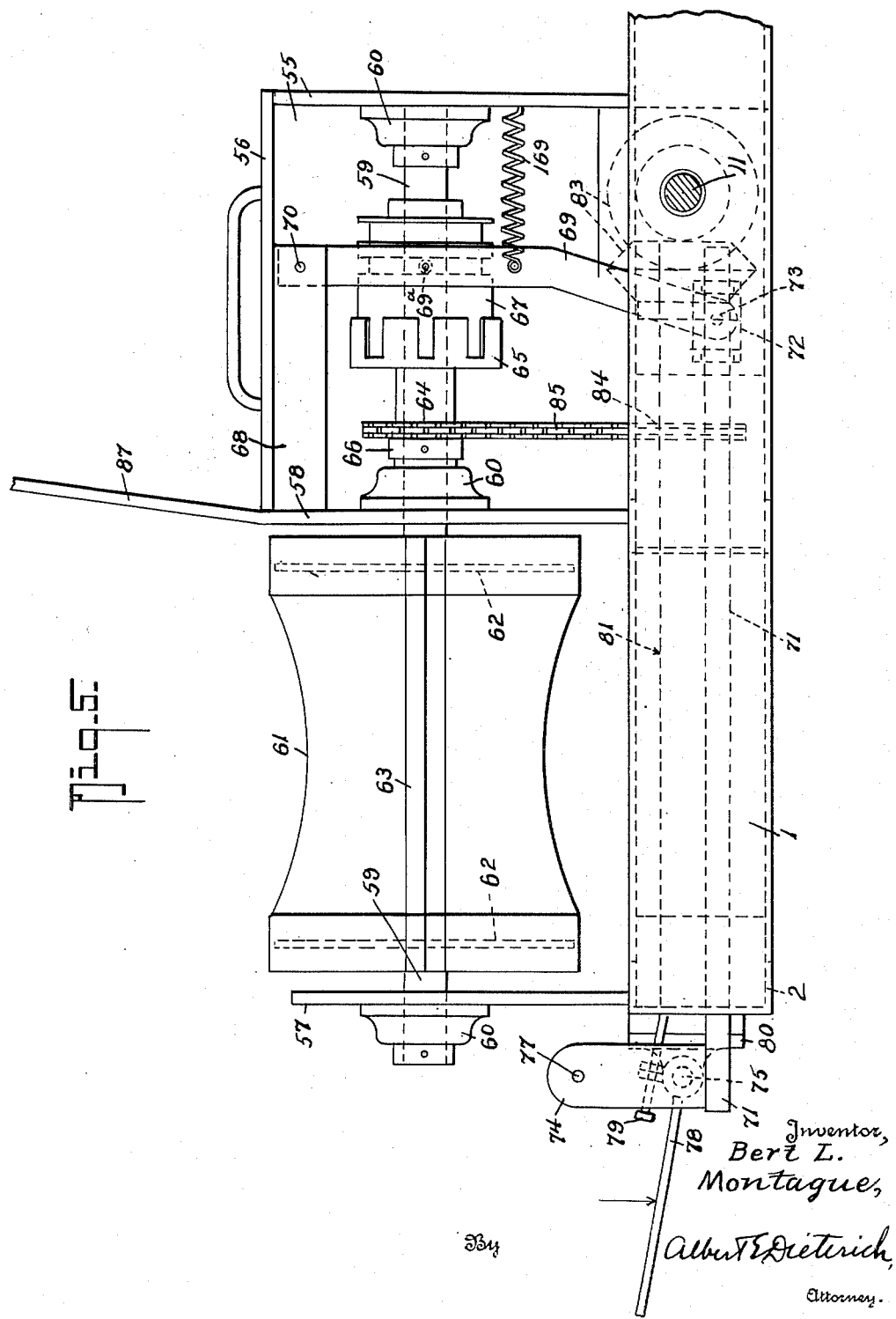
Inventor,
Bert L. Montague,
By Albert E. Dietrich,
Attorney.

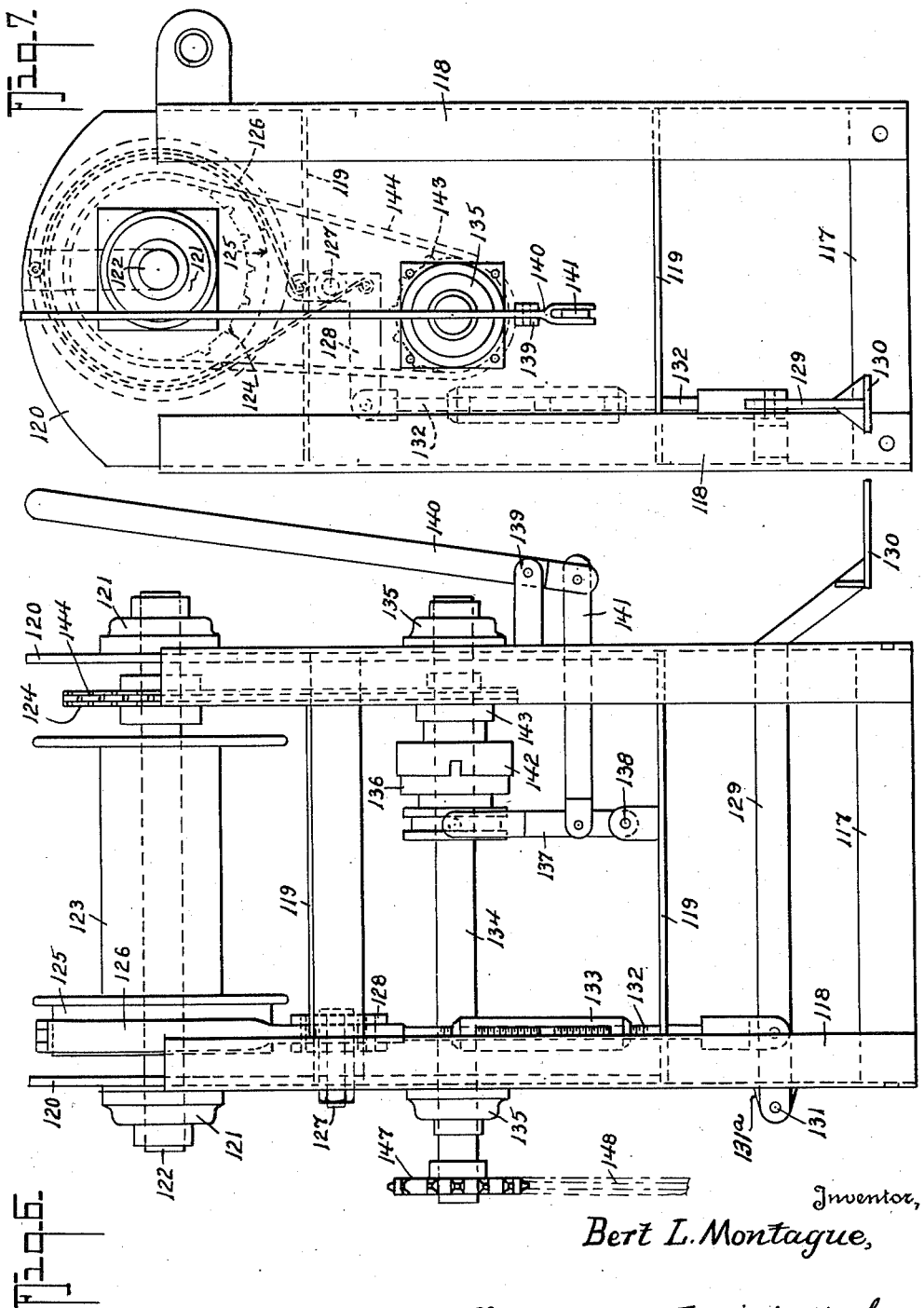

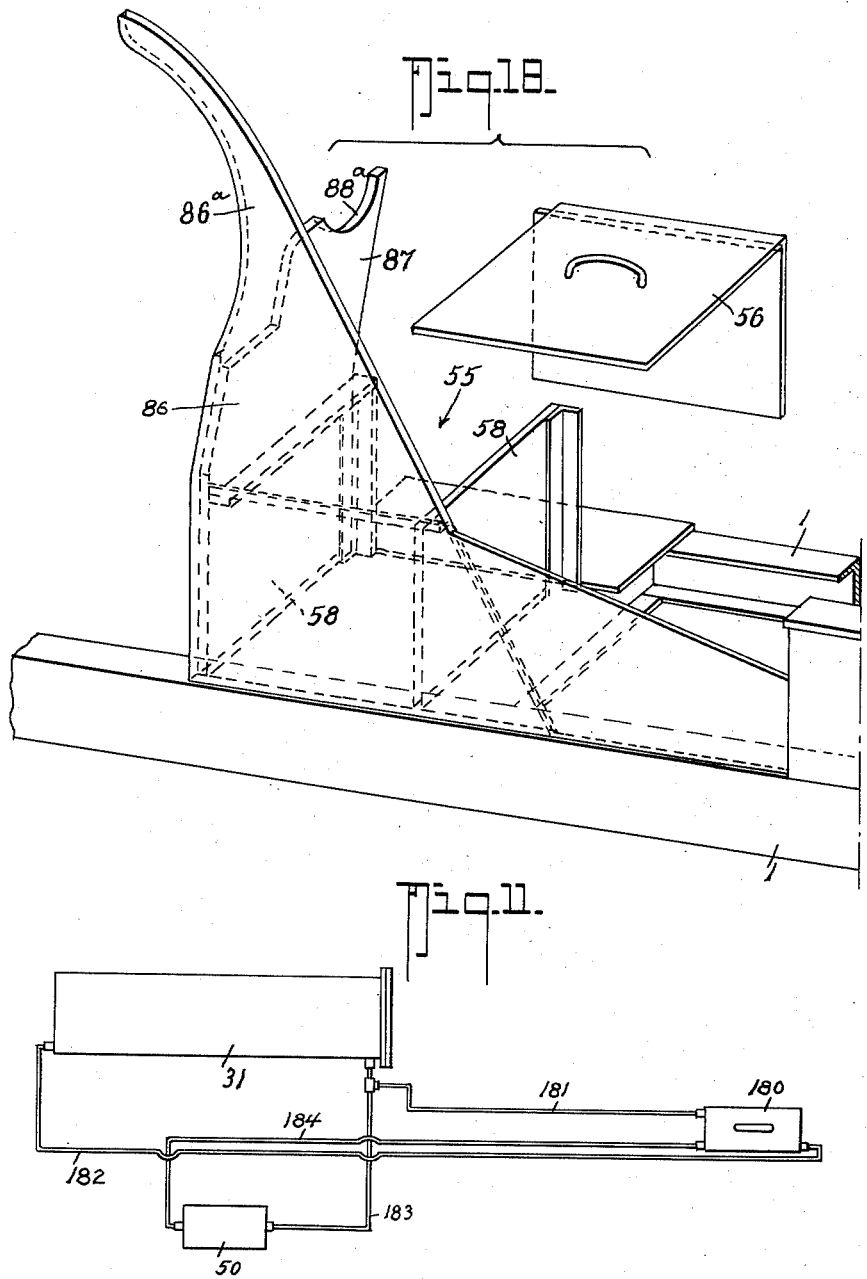

Aug. 1, 1950        B. L. MONTAGUE        2,517,016
PULPWOOD HARVESTER CARRIAGE
Filed April 3, 1947        10 Sheets—Sheet 9
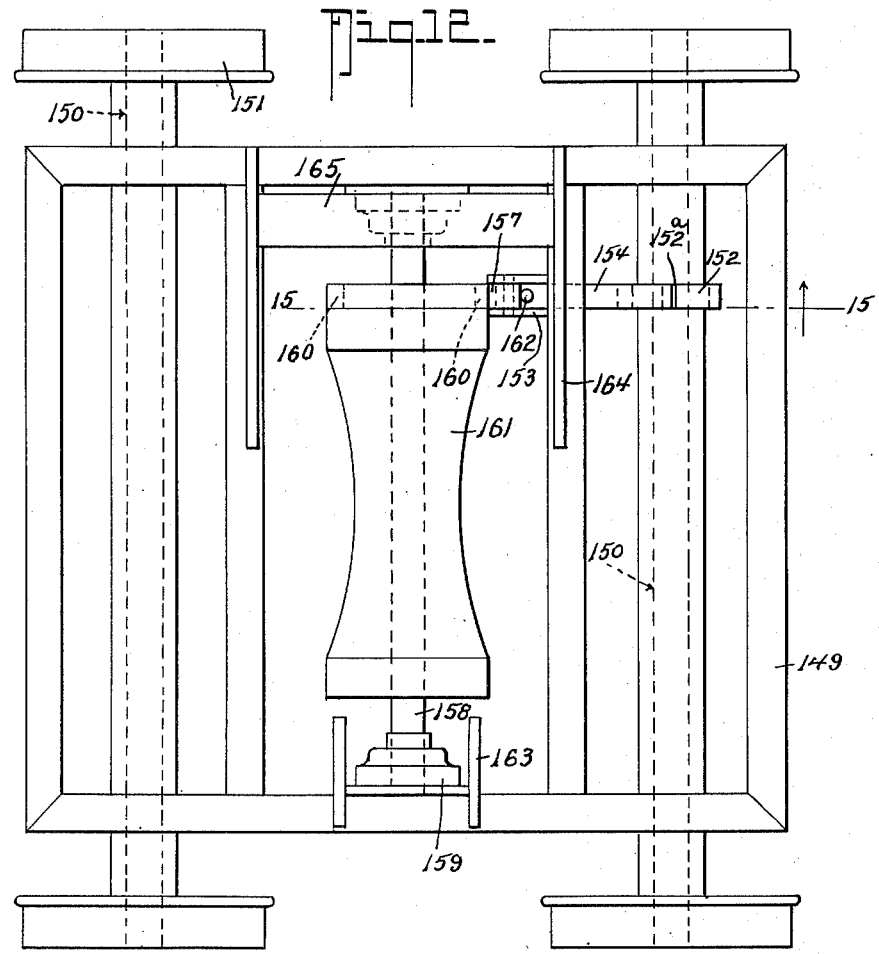
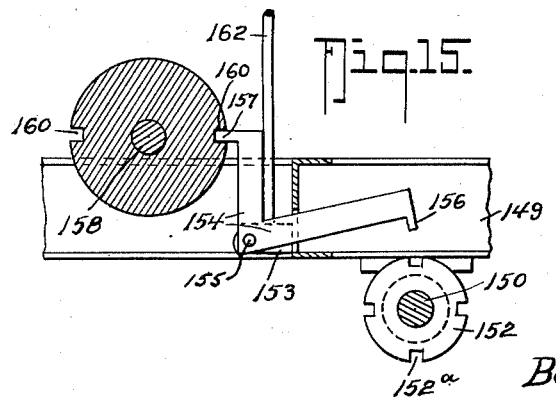
Inventor,
Bert L. Montague,
By Albert E. Dieterich,
Attorney.

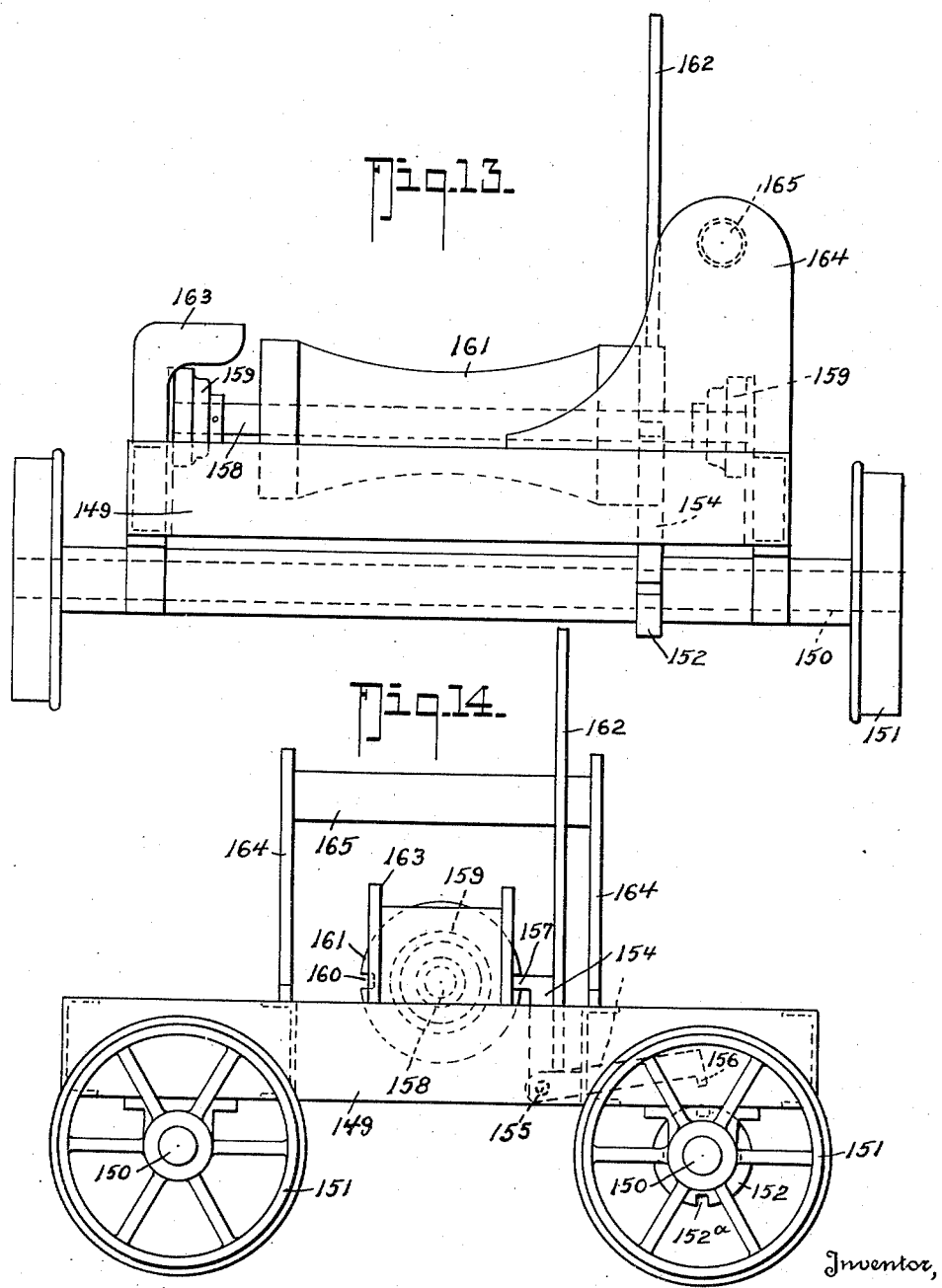

Patented Aug. 1, 1950

2,517,016

UNITED STATES PATENT OFFICE 2,517,016

PULPWOOD HARVESTER CARRIAGE

Bert L. Montague, Sumter, S. C.

Application April 3, 1947, Serial No. 739,213

2 Claims. (Cl. 143—105)

My invention has for its general purpose to provide a machine for mechanically cutting up tree lengths of pine or hardwood logs into short lengths suitable for pulpwood and loading them onto a carrier, such as truck, barge or railroad car.

The machine consists of the following parts or sub-units: main machine, track dolly, elevating knees, cross haul unit and hydraulically controlled extension to the main unit.

The objects of the invention, in general, are:

1. To provide a machine of the character stated which can readily be transported or towed from place to place as desired.

2. To provide a machine the parts of which, when assembled for operation, constitute unitary construction all parts of which cooperate in accomplishing the final result, which is to take a tree length log from the ground, divide it into suitable lengths for loading and load these lengths on a suitable transporting vehicle, in the sequence stated.

3. To provide means whereby the saw dust is thrown away from the operator.

4. To provide means to prevent the thrown saw dust from getting into the elevator or main machine.

5. To provide for controlling the operation of the powered feed roll by the same operator who controls the application of the saw to the tree log.

6. To provide a machine with a main counter shaft to which power is applied from the prime mover, via a clutch which, when disengaged, cuts all power off of all parts of the machine and to control this disengagement by a pedal or lever at the foot of the saw operator. From this counter shaft power is transmitted to the saw, through a gear box to the powered feed roll, and to endless chain elevating conveyors of the main unit.

7. To provide a saw on an arm hinged on the main counter shaft itself and driven by a V-belt whose tension remains constant in all positions of the saw arm.

8. To provide for driving the cross haul unit from the lower sprocket shaft of the log elevator (main machine) through detachable universal joints for ease in assembly in the field.

9. To provide means to lock the dolly against rolling on the track while freeing the log roll and vice versa as desired.

10. To provide a shield for the motor on the saw side, which shield has provision for keeping the saw dust which impinges against the shield from the area of the motor and against the motor itself.

11. To provide a log stop of special design so that the log in being cross-hauled will not be thrown into the saw itself.

12. To provide a quick way to assemble the elevating arms and knees and to provide safety chains to prevent "cocking up" when the log is being cross-hauled.

13. To provide a special type of powered feed roll, for lightness as well as durability and effectiveness in propelling the log along the track.

14. In general to provide a safe, practical, rugged, yet comparatively light machine which will effectively serve its intended purposes.

Other objects will be obvious to those skilled in the art.

To the attainment of the aforesaid objects and ends, invention further resides in the novel details of construction, combinations and arrangements of parts all of which will first be fully described and then be specifically pointed out in the appended claims reference being had to the accompanying drawings in which:

Figs. 1$^A$, 1$^B$, 1$^C$ and 1$^D$ when joined on the respective lines A—B, C—D and E—F constitute Fig. 1, which is a top plan view of my invention in its entirety.

Fig. 2 is a side elevation on a reduced scale of the log elevating and loading portion of my apparatus, the side shield being omitted.

Fig. 3 is a top plan view of the same, the top shields being omitted.

Fig. 4 is an enlarged detail top plan view of the log advancing drum or roller and the power transmission and control associated therewith.

Fig. 5 is an elevation of the same looking in the direction of the arrow in Fig. 4.

Fig. 6 is an enlarged detail elevation of the log rolling mechanism.

Fig. 7 is an end elevation of the same looking from right to left in Fig. 6.

Fig. 8 is an enlarged side elevation of one of the elevating arms and its elevating knee.

Fig. 9 is a plan view on a reduced scale of the sheet metal blank which when rolled into a tubular form constitutes the perimeter of the log advancing or powered feed roller.

Fig. 10 is an end elevation of the complete feed roll.

Fig. 11 is a schematic view of the hydraulic system for raising and lowering the last section of the log elevator and loader portion of the apparatus.

Fig. 12 is an enlarged top plan view of the dolly on which the log to be sawed rests.

Fig. 13 is a rear elevation of the same.

Fig. 14 is a side elevation of the same.

Fig. 15 is a detail section on the line 15—15 of Fig. 12.

Fig. 16 is a detail front elevation of the adjustable hinged pressure pump support and belt tightener.

Fig. 17 is a side elevation of the same, looking in the direction of the arrow in Fig. 16.

Fig. 18 is a detail perspective view on an enlarged scale showing the log stop, the saw stop and arm holder and the gear box and its cover.

Figure 1A:
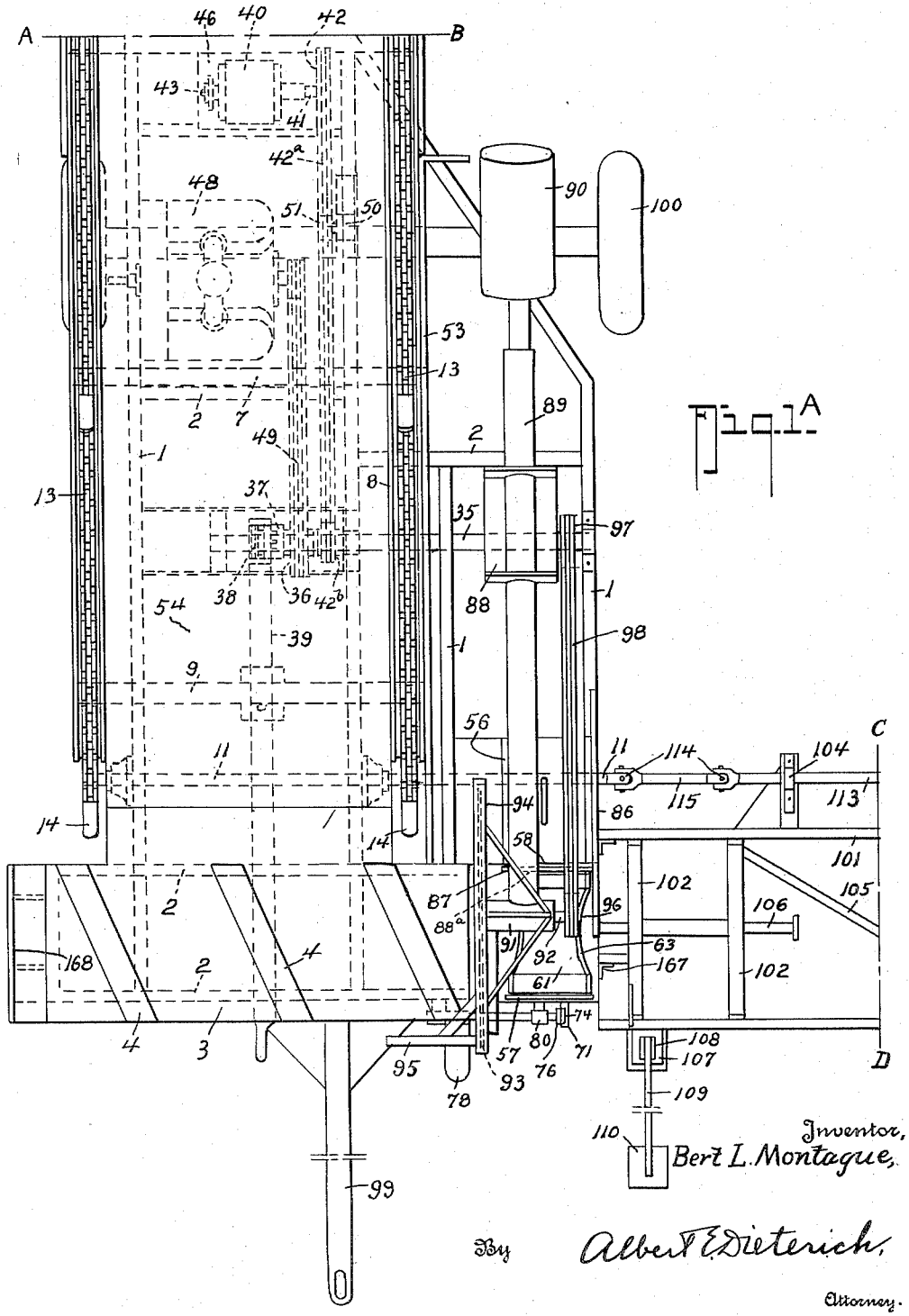

In the drawings in which like numerals and letters of reference indicate like parts in all the figures, the main frame of the main unit of the machine is composed of longitudinal channel irons or beams 1 and transverse channel irons or beams 2. At the entrant end of the main frames is mounted an inclined platform or log slide 3, on which is welded diagonally disposed pipes 4 on which cut logs slide or roll down toward the elevator. Bearing supporting cross bars or plates 5 are provided as parts of the frame while uprights 6 support cross beams 7 that carry the chain ways 8 of the elevator. Pairs of bracket plates 9 and 10 are secured to the chain-ways 8 and carry bearings 22 for the conveyor shafts 11 and 12 respectively. The shafts 11 and 12 carry sprockets 15 around which the endless chains 13 pass. These chains have their upper flights disposed in the channelled chain-ways 8 as best shown in Figs. 1A and 2 and at suitable intervals carry dogs 14 which are so designed as to lap over at least two links of the chain so as to distribute the load over several links of the chain by means of a center rear supporting rib 14a.

Pivoted on shaft 12 by means of bracket plates 18 are chain-ways 16 that are connected by diagonal beams 17, and at one end by cross plates 19 and 20. At the other end bracket plates 23 have bearings for a sprocket shaft 24 while an intermediate bearing bracket 21 secured to plate 20 aids in supporting the extension unit (parts 16, 17, 18, 19, 20, 21, 23, etc.) pivotally on shaft 12.

Endless chains 25 pass around sprockets 25a on shafts 12 and 24, the upper flights of which chains ride in the chain-ways 16. Chain dogs 26 of like construction to the chain dogs 14 are secured to the chains 25 at suitable intervals.

At its free end the extension unit has curved guards 27 cross-connected by bars 28 to prevent the logs which roll off the end of the unit from being dragged back under the unit by the chain dogs.

Secured to and beneath the plate 19 are brackets 29 (see Fig. 2) which carry a shaft 30 on which is mounted the outer end of a piston rod 34 of a hydraulic jack, the other element of which comprises a cylinder 31 that is pivoted at its inner end to a rod 32 carried by beams 33. The hydraulic jack lies beneath the elevator of the main machine out of the way so as to allow the vehicles to be loaded to be backed clear under the extension unit up to the rear shield 52 (Fig. 2) of the main unit of the machine.

Power is applied to a main counter shaft 35 from a suitable motor 48 that is mounted on the frame of the main unit by means of a belt 49 taking over pulleys on the motor shaft and shaft 35. Pulley 36 runs loose on shaft 35 and has a suitable clutch element 37 to mesh with the shiftable clutch element 38 that is keyed to be slid on the shaft 35 by the clutch shifting lever 39 that extends to the front of the main unit in convenient reach of an operator.

40 designates a suitable reduction gear device whose input shaft 41 is driven by a belt and pulley connection 42—42a from a pulley 42b fastened on shaft 35, and whose output shaft 43 has a sprocket and chain connection 46 with a secondary counter shaft 44 journalled in bearings 45 on the rear uprights 6. A sprocket and chain connection 47 operatively connects shafts 44 and 12 together so as to drive both elevating conveyors 13, 13 and 25, 25.

The hydraulic pump 50 which furnishes the power to operate the jack 31 is mounted on the main frame of the main unit and derives its power from a pulley 51 which engages the belt 42a as a belt idler. The pressure pump 50 is mounted on an angle iron support 170 which is welded to a bar 171 that is hinged at 172 to the lug 173 on the channel iron post 174. The support 170 can be raised to increase the pressure of pulley 51 against the belt 42a by means of an adjusting screw 175 (see Figs. 2, 16 and 17).

In order to protect the parts below the elevator of the main unit from saw dust thrown back by the saw 93 (later described) the entire righthand side of the unit is protected by a shield 53. A further shield 54 extends between the chainways 8 and covers the top of the unit (Fig. 1A). The shield 54 preferably extends from the platform 3 to the upper ends of the chain-ways 8.

55 designates a clutch and gear box having a removable cover 56 (see Figs 1A, 4 and 5). This box 55 is located to one side (right-hand in Fig. 1A) of the elevator of the main unit as is also the log feeding and sawing mechanism now about to be described.

Referring now to Figs. 4 and 5 it will be seen vertical supports 57 and 58 carry bearings 60 for the shaft 59 on which the powered feed roll 61 is mounted. The roll 61 is of a special light construction (Figs. 9 and 10) and is formed by rolling a blank shaped as in Fig. 9 into tubular form, welding the edges together and welding disc-like heads 62 in the ends. Inverted V-shaped-in-cross-section bars 63 are welded at diametrically opposite points to insure effective gripping of the log.

The shaft 59 has a sprocket 64 formed as a part of a clutch member 65 which runs loose on the shaft and is held against movement along the shaft in one direction by a collar 66. The clutch member 65 cooperates with a shiftable clutch member 67 keyed to shaft 59. The member 67 is shiftable into and out of engagement with member 65 by means of a forked clutch shifting lever 69 that is pivoted at 70 to a bracket 68 and is constructed to engage clutch member 67 as at 69a. The end of lever 69 opposite the pivoted end is connected at 73 to a trunnion block 72 on a pull rod 71 that extends to the front end of the main unit and there carries an arm 74 that is pivoted at 77 to a similar arm 76 on a pedal shaft 75. The shaft 75 is journalled in bearings 80 and has a pedal 78 and a stroke-adjusting screw 79.

The shaft 11 has a bevel gear connection 83 with a shaft 81 that is journalled in bearings 82 and has a driving sprocket 84 around which and sprocket 64 a drive chain 85 passes.

In order to prevent the tree trunk logs from swinging over into the saw I provide a log stop 86, best shown in Figs. 4 and 18. This stop is curved as at 86a to over-lie the log and serves not only to prevent the log being moved back towards the saw pivot but prevents the log from rising toward the saw while the saw is in its elevated or inactive position.

The support 58 is continued upwardly to act as a saw bar stop 87 to limit the lowering movement of the saw and is best shown in Fig. 18. It is provided with a recess or seat 88ª in which the saw arm rests at the lowest position of the saw.

Freely pivoted on shaft 35 is a saw-arm holder 88 in which the saw arm or frame 89 is securely held. One end of the arm 89 carries a bearing 91 in which the saw arbor or shaft 92 is journalled while a counterweight 90 is carried by the other end of the arm 89. The saw 93 is guarded by a suitable guard 94 and is lowered to the log by means of a handle 95. The saw is driven by means of a belt 98 taking over pulleys 96 and 97 on the arbor 92 and shaft 35 respectively. The belt and pulleys are preferably of the V-type and the belt is kept under uniform tension regardless of the position of the arm 89 on its fulcrum.

A suitable draft tongue 99 on the front end of the machine, the main unit, provides a convenient way to attach a tractor when it is desired to tow the machine from one location to another. The main frame is mounted on a suitable wheeled axle 100 as shown in Fig. 1ᴬ.

The foregoing describes the construction of the main and extension units of the machine.

We will now describe the cross haul unit and its operating instrumentalities, by reference particularly to Figs. 1ᴬ, 1ᶜ and 1ᴰ. This unit comprises two sections of trackage coupled together as at 166 (Fig. 1ᶜ) and connected to the main frame as at 167 in any approved way. Each section of trackage comprises a pair of rails 101 joined by cross-ties 102 and braced by diagonal braces 105. The rails are also provided with anchoring feet 103 having apertures through which spikes or stakes may be driven to hold the track sections in place while in use. Shaft bearings 104 are secured to the rails and carry the extension shaft 113.

A draft bar 106 is provided by means of which the track sections may be dragged from place to place when desired.

At suitable intervals along the track at its front side are located several elevating knees 108 on bases 107 secured to the track rails 101. The knees 108 have cross pins 111 on which the upper ends of elevating arms 109 are hooked. Each arm 109 has a base 110 to rest on the ground. A chain 112 connects the base of the knee 108 with its arm 109 and prevents the knee from "cocking up" when a log is being cross hauled.

The extension shaft 113 is joined to the shaft 11 by two detachable universal joints 114 and 115.

At a suitable location along the far side of the trackage is located a log hauling apparatus, which is best shown in Figs. 1ᶜ, 6 and 7, by reference to which it will be observed that on a base 117, which is suitably secured to the trackage, are four corner angle irons 118 which support horizontal plates 119 as an integral structure, and side plates 120 the latter carrying the bearings 121 for the cable or chain drum or reel 123 and the bearings 135 for a clutch shaft 134.

The shaft 122 of the reel 123 is journalled in the bearings 121 and carries a sprocket 124 over which and a sprocket 143 carried by the free clutch member 142, a driving chain 144 passes.

The reel 123 has a brake drum 125 around which a brake band 126 passes. The ends of the band 126 are connected to a bell crank lever 128 at opposite sides of its pivot on a stud 127. The lever 128 is connected by a rod 132 and turnbuckle 133 to a foot lever 129 that is pivoted at 131 to a bracket 131ª projecting from one of the uprights 118. The lever 129 has a foot pedal 130 as shown.

Keyed to and slidable on shaft 134 is a shiftable clutch element 136 operable by means of a shifter fork 137 pivoted at 138 and connected with a clutch shifting lever 140 by a link 141. The lever 140 is pivoted to a lug 139 on the plate 120.

A hook 145 is secured to the trackage to which one end of a hauling chain or wire rope cable 146 is connected, the other end of which is connected to the reel or drum 123.

Shaft 134 is driven from shaft 113 via a sprocket and chain connection 116, 148, 147.

Referring now to Figs. 12 to 15 inclusive the construction of the dolly which runs on the trackage will be understood. The dolly comprises a suitable frame 149 mounted on axles 150 having traction wheels 151 of suitable kind. One axle has a notched disc 152.

Pivoted at 155 to a bracket 153 on the frame 149 is a double-acting lever one of whose arms 154 carries a finger 156 to enter the stop recesses 152ª of the disc 152. The other arm of the lever has a finger 157 to enter a notch 160 in an end of roller 161. A lever 162 fastened to lever 154 enables that lever to be rocked from one position to the other, either to hold shaft 150 from turning or hold roller 161 from turning as the case may be. The shaft 158 of the roller 161 is journalled in bearings 159 on the frame 149.

Log skid brackets 163 are located on the frame 159 at the entrant end of the roller 161 while log stop plates 164 and cross bar 165 are located, at the far end of the roller, on the frame 149.

*Operation*

With the machine units assembled as shown in Fig. 1, the chain or cable 146 is unwound in part from reel 123 and passed under a log L lying parallel to the trackage. The end of the cable is then placed on the hook 145 and lever 140 operated to throw in the clutch, whereupon the cable will be wound up on the reel and the log will be rolled up the elevating arms and over onto the feed roll 61 and dolly roll 161 after which cable 146 is released from the hook 145.

In practice two operators are used on the machine and two others at the load-receiving vehicle. One machine operator manipulates the log cross haul mechanism (Figs. 6 and 7) and the dolly brakes and the other controls the stopping and starting of the machine and the operations of the saw. The two loaders simply see that the cut lengths are properly placed on the receiving vehicle when delivered by the elevator and loader.

The log having been received on the dolly and powered feed roll, the saw attendant steps on the treadle 78 to throw in the clutch 67 which starts the roller 61 and draws the log endwise until it hits the log end stop 168 (Fig. 1ᴬ) whereupon he releases the treadle 78 and spring 169 throws out the clutch. The saw operator then grasps handle 95 and brings the saw down on the log to sever a section from the tree trunk. This severed section rolls down the platform 3 and is picked up by the dogs 14 on the main elevator chains and by them carried up and deposited on the extension unit, by the conveyors of which the log is carried to and discharged onto the vehicle being loaded. The extension unit having its free end raised or lowered as required by the hydraulic jack 31, 34 as required, through manipulation of a control valve 180 as will be clear to those skilled in the art.

As soon as one length has been sawed from the tree-trunk log the operation is repeated again and again.

If the tree-trunk log overhangs the dolly, the attendant sets the wheel stop by rocking lever 154 to cause it to engage disc 152 and disengage roller 161. This set up is left to remain until the end of the log nears roller 161 whereupon the attendant reverses lever 154 to disengage the axle disc 152 and lock the roller 161. Thereafter as the log is fed forward by the powered feed roll 161 the dolly will ride along the trackage until the dolly arrives adjacent the roll 61 and the log is fully sawed, after which the dolly is returned to its initial position to receive a second tree-trunk log.

The dogs on the elevator chains are so spaced apart and the timing of the chains operations are such that no two log lengths can interfere with one another and the load adjusters will have ample time to adjust the logs on the receiving vehicle after they have been deposited by the elevator extension unit.

As shown in Fig. 11, the control valve 180, which is preferably located at the discharge end of the extension unit (Fig. 2), is connected to the low pressure end of the hydraulic cylinder by a duct 181 and by a duct 183 to the low pressure side of the pump 50. The high pressure side of the pump 50 is connected by a duct 184 to the valve 180. The high pressure end of the cylinder 31 is connected to the valve 180 by a duct 182.

The operator at the discharge end of the machine by manipulating valve 180 to connect high pressure lines 182, 184 will cause the extension unit to rise and conversely by exhausting the high pressure line 182 the low pressure will lower the extension unit. Any approved type of control valve 180 may be used as suitable valves are well known.

From the foregoing it will be seen that I have provided a very effective pulpwood harvesting machine by the use of which the pulpwood can be loaded and sent out of the woods as fast as it is cut and the trouble and expense of maintaining large, scattered inventory is eliminated. By the use of my machine a better and more permanent class of employees can be maintained around a mechanized woods operation because heavy, back-breaking labor is eliminated. By careful coordination of the activities of the various members of the crew my machine makes it possible to double the output per man.

From the foregoing description taken in connection with the accompanying drawings it is thought the construction, operation and advantages of the invention will be clear to those skilled in the art and I desire it further understood that when I use the term "cable" with reference to the element 146 that term shall include a chain as well as a flexible wire cable.

What I claim is:

1. In a pulpwood harvesting machine, track rails, a dolly comprising a frame mounted on wheeled axles whose wheels run on said rails, a log supporting roller mounted on said wheeled frame, a two-way latch device mounted on said wheeled frame, and operatively engaging said roller and one of the wheeled axles alternately to lock the dolly from movement along the rails or lock the roller against turning, a log stop at the far side of the dolly frame and log skids at the near side of the dolly frame.

2. In a portable pulpwood harvesting machine which includes a log saw, means for feeding a log to the saw, said means including a trackage unit which unit includes a dolly, track rails on which the dolly runs, and a fixedly located log feed roller, said dolly comprising a frame mounted on wheeled axles whose wheels run on said rails, a log supporting roller mounted on said wheeled frame, a two-way latch device mounted on said wheeled frame and operatively engaging said roller and one of said wheeled axles alternately to lock the dolly from movement along the rails or lock the log supporting roller against turning.

BERT L. MONTAGUE.

REFERENCES CITED

The following references are of record in the file of this patent:

UNITED STATES PATENTS

| Number | Name | Date |
|---|---|---|
| 39,880 | Brown | Sept. 15, 1863 |
| 285,982 | Fachmon | Oct. 2, 1883 |
| 296,334 | Jones | Apr. 8, 1884 |
| 400,790 | Pratt et al. | Apr. 2, 1889 |
| 504,589 | Kaime | Sept. 5, 1893 |
| 711,947 | Dittbenner | Oct. 28, 1902 |
| 719,585 | Hanssler | Feb. 3, 1903 |
| 726,165 | Hunt | Apr. 21, 1903 |
| 785,400 | Buchanan | Mar. 21, 1905 |
| 817,628 | Cummiskey | Apr. 10, 1906 |
| 825,518 | Cox | July 10, 1906 |
| 1,001,272 | Howard | Aug. 22, 1911 |
| 1,043,169 | Tenow et al. | Nov. 5, 1912 |
| 1,262,943 | Gustafson | Apr. 16, 1918 |
| 1,492,317 | Willette | Apr. 29, 1924 |
| 1,576,025 | Baumhover | Mar. 9, 1926 |
| 1,782,607 | Freeman | Nov. 25, 1930 |
| 2,410,887 | Locke | Nov. 12, 1946 |

FOREIGN PATENTS

| Number | Country | Date |
|---|---|---|
| 104,894 | Austria | Dec. 10, 1926 |